Figure 1:
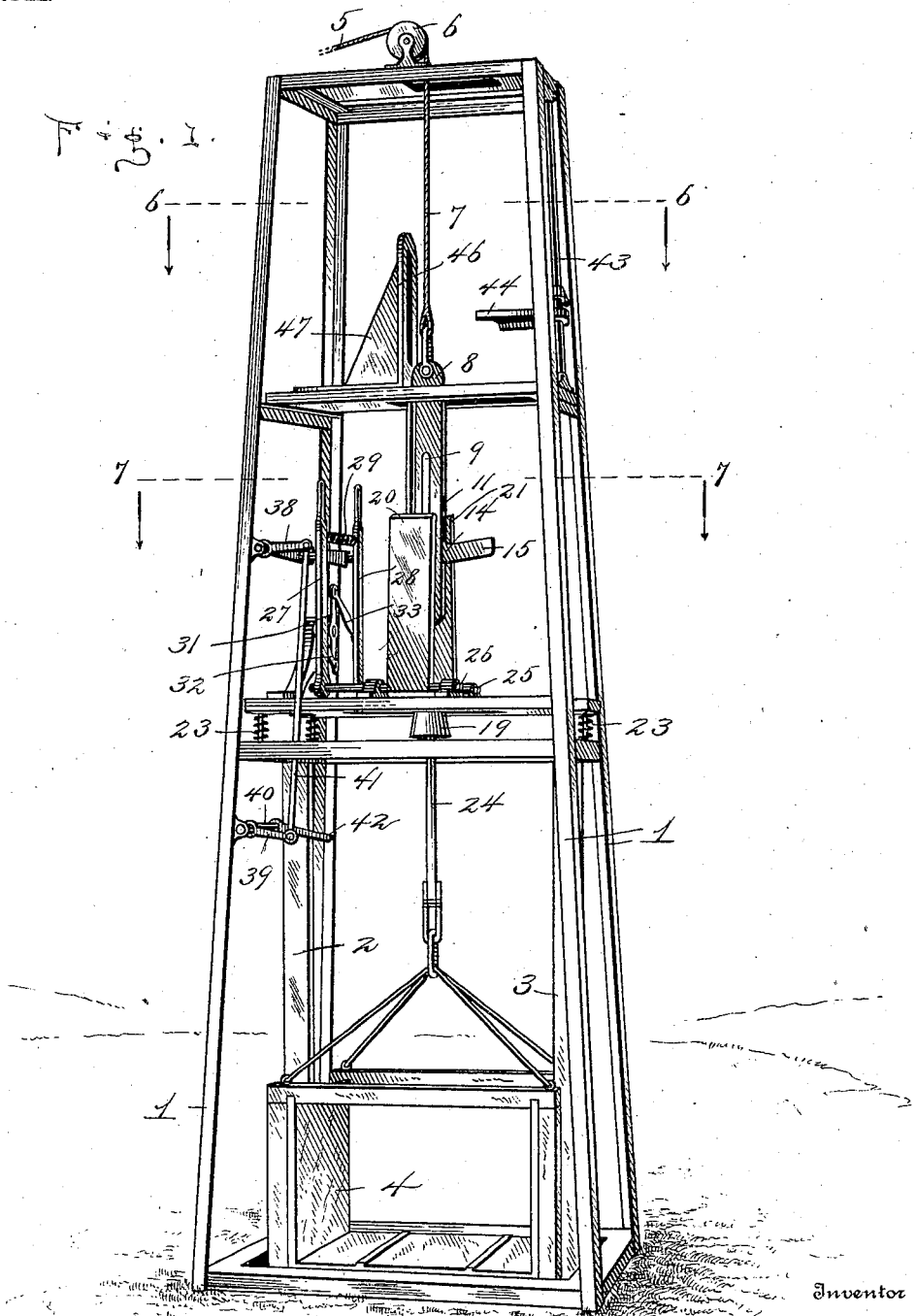

No. 725,491. PATENTED APR. 14, 1903.
J. G. SCOTT.
ELEVATOR.
APPLICATION FILED SEPT. 6, 1902.
NO MODEL. 5 SHEETS—SHEET 1.

Witnesses

Inventor
John G. Scott.
By Victor J. Evans
Attorney

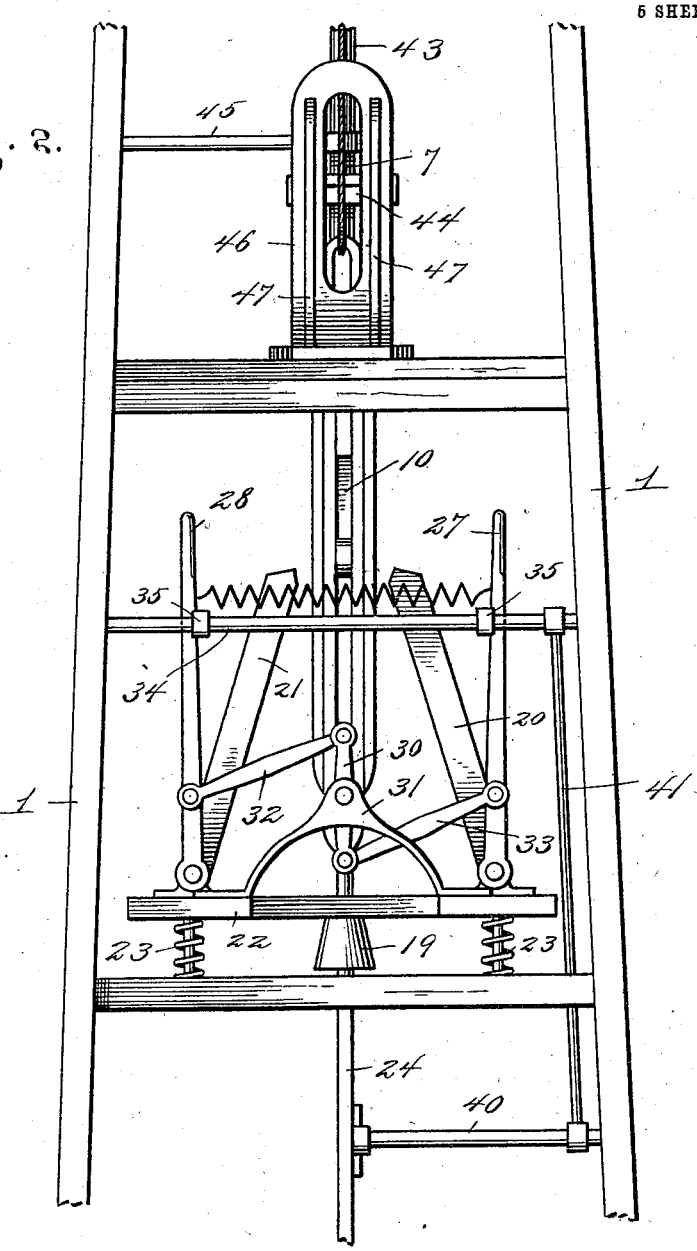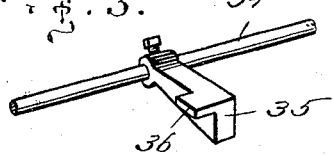

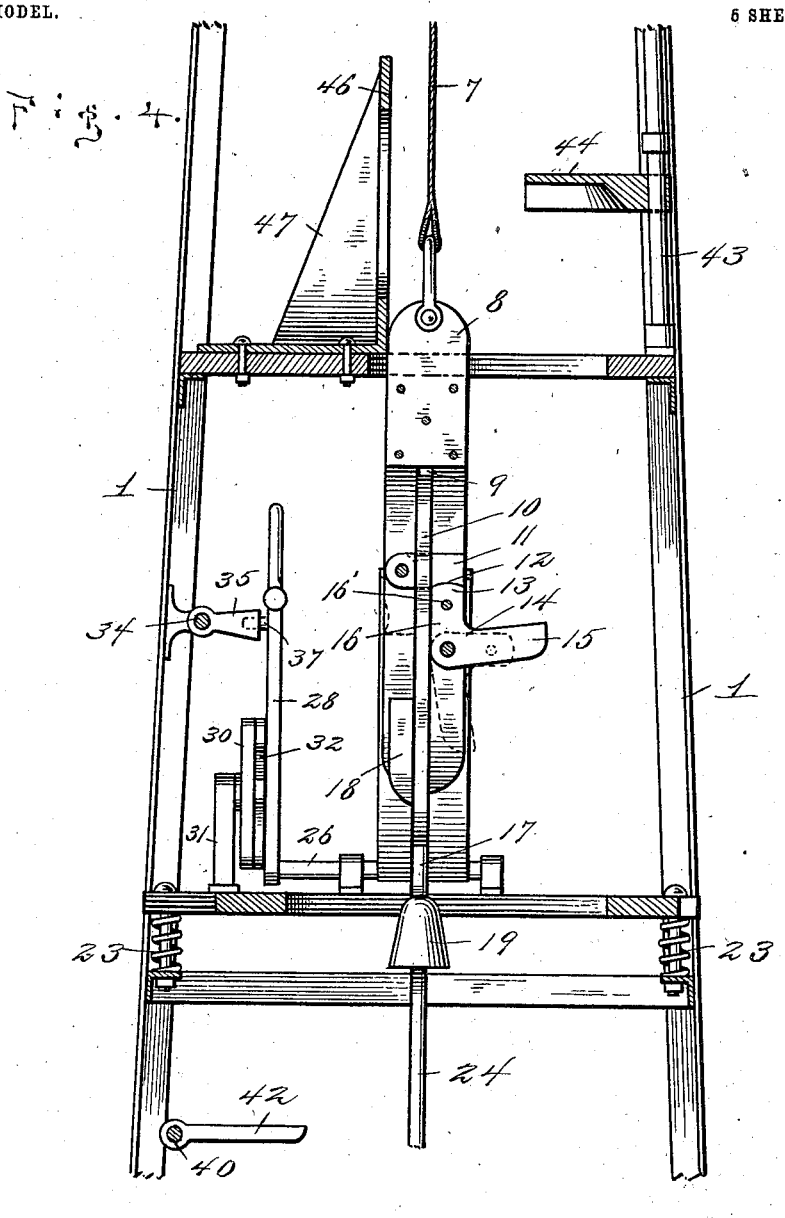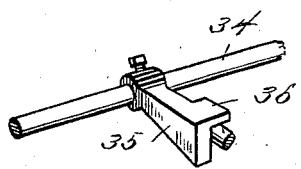

No. 725,491. PATENTED APR. 14, 1903.
J. G. SCOTT.
ELEVATOR.
APPLICATION FILED SEPT. 6, 1902.
NO MODEL. 5 SHEETS—SHEET 4.

Witnesses
Inventor
John G. Scott.
By Victor J. Evans
Attorney

No. 725,491. PATENTED APR. 14, 1903.
J. G. SCOTT.
ELEVATOR.
APPLICATION FILED SEPT. 6, 1902.
NO MODEL. 5 SHEETS—SHEET 5.
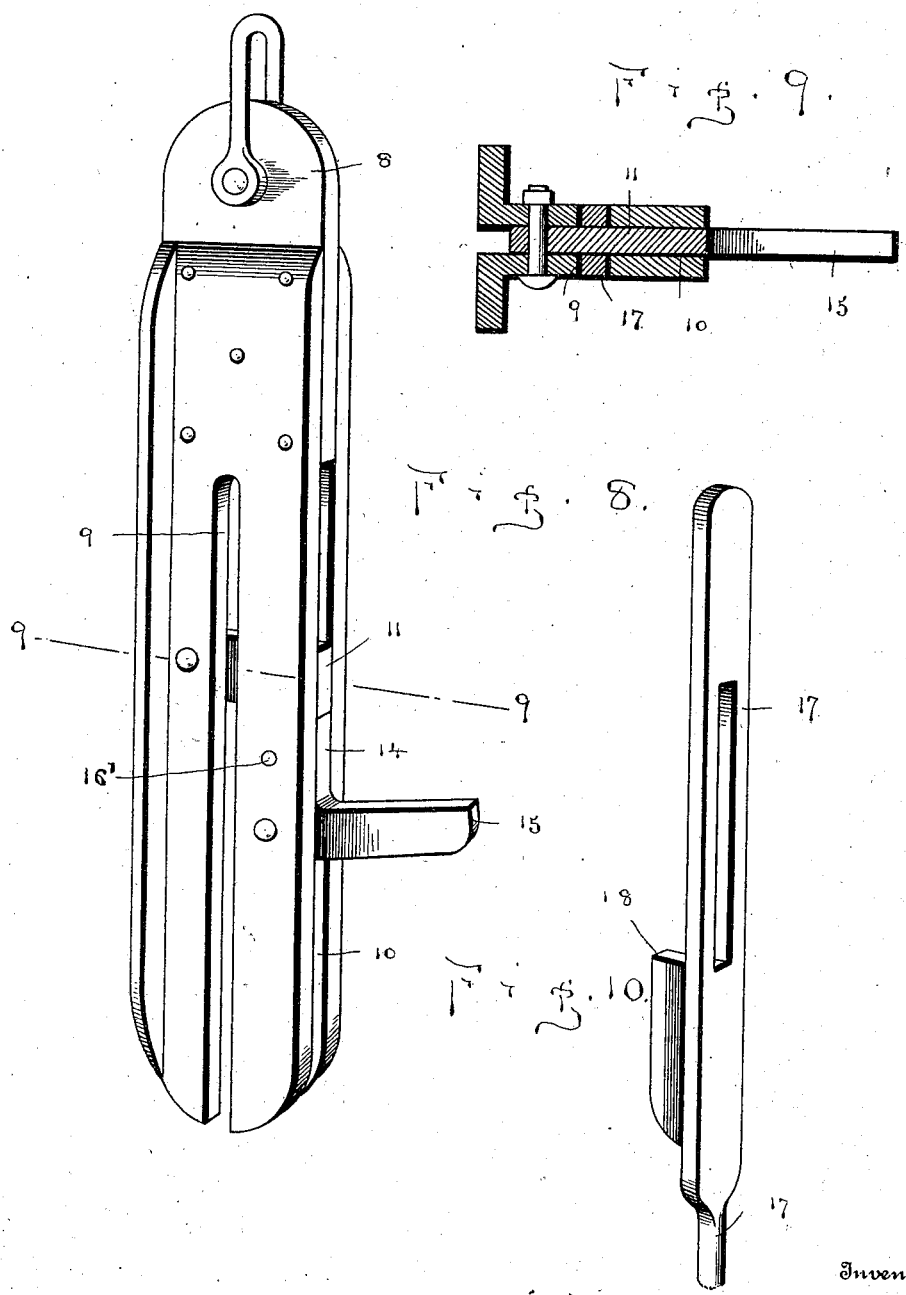
Witnesses
Inventor
John G. Scott.
By Victor J. Evans
Attorney

UNITED STATES PATENT OFFICE.

JOHN G. SCOTT, OF GIRARDVILLE, PENNSYLVANIA.

ELEVATOR.

SPECIFICATION forming part of Letters Patent No. 725,491, dated April 14, 1903.

Application filed September 6, 1902. Serial No. 122,391. (No model.)

*To all whom it may concern:*

Be it known that I, JOHN G. SCOTT, a citizen of the United States, residing at Girardville, in the county of Schuylkill and State of Pennsylvania, have invented new and useful Improvements in Elevators, of which the following is a specification.

This invention relates to elevators, and more particularly to a safety device for the elevator or cage in a mine-shaft.

The object of the invention is to provide a safety device which will be automatically actuated when the cage has reached a predetermined position with relation to the supporting skeleton tower constructed above the shaft, so that when the cage reaches the determined height the cable propelling it will be released and the cage will be left suspended in the tower.

Another object is to so efficiently and thoroughly release the cable from the cage as to prevent or obviate the liability of the tower becoming demolished, an effect which results not infrequently with the construction now generally employed.

As is well known, the cage or elevator in the shaft travels with extreme velocity, and it is sometimes impossible for the engineer to stop the engine at a suitable point whereby the cage will rest suspended on or near the level of the surface of the ground. If by disarrangement of the machinery or owing to the velocity or momentum of the cage it travels to an undue height, the tower is liable to become strained, or in the event that the engine is not stopped in time the tower may be completely demolished. With the construction similar to that employed by me the injurious results will be obviated, owing to the fact that the cable is completely released from engagement with the cage under abnormal conditions and can pass from the tower, so that notwithstanding the number of revolutions made by the winding-drum no injurious results can occur to the elevator mechanism or the tower supporting it.

The peculiar manner of accomplishing the desired results, as well as the novel details of construction, will be specifically set forth in the following description, and the specific features of novelty will be defined in the appended claims.

Figure 6:
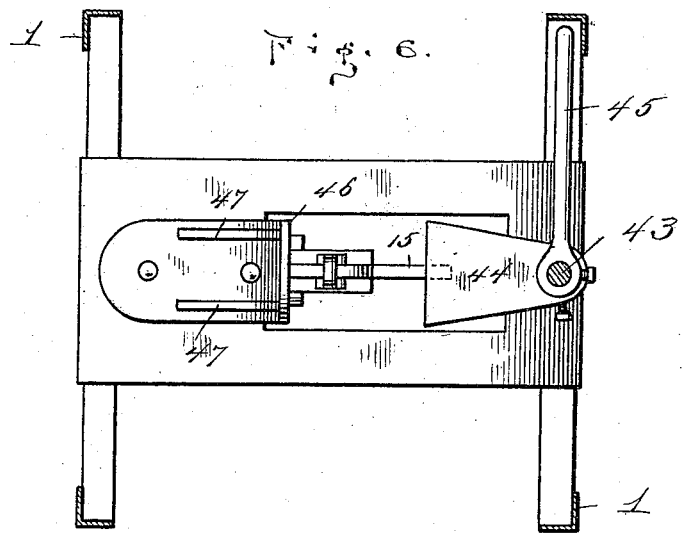
Figure 7:
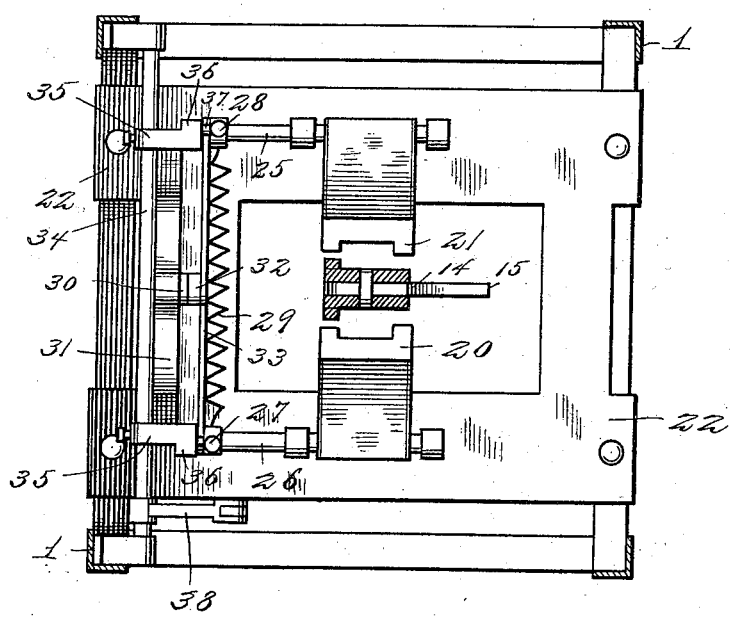

In the drawings, Figure 1 represents a perspective view of a tower arranged over a mine-shaft, showing the position of the elevator or cage and the safety mechanism under normal conditions. Fig. 2 is an enlarged view in elevation of the clevis-supporting jaws and cooperating parts of the safety device. Fig. 3 is a detail perspective view of one of the trip-arms. Fig. 4 is a vertical longitudinal sectional view through the safety device. Fig. 5 is an enlarged detail perspective view of one of the trip-arms. Fig. 6 is a cross-sectional view on the line 6 6 of Fig. 1, and Fig. 7 is a cross-sectional view on the line 7 7 of Fig. 1. Fig. 8 is an enlarged detail perspective view of the clevis. Fig. 9 is a cross-sectional view on the line 9 9 of Fig. 8, and Fig. 10 is a detail perspective view of the end of the supporting-rod.

The reference-numeral 1 designates a skeleton tower of preferred construction in which are arranged two diametrically opposite vertically-disposed guide-rails 2 and 3, which form continuations of the guide-rails of the cage 4 from within the mine-shaft. The cage or elevator 4 is guided on the rails 2 and 3 by suitable grooves or cleats vertically arranged, whereby lateral displacement of the cage will be prevented. The cage is suspended within the tower and from a cable 5 by suitable connection, to be described hereinafter. This cable 7 passes over a pulley 6 on the top of the tower and through an opening in the top of the tower. On the extremity of the cable is a clevis which comprises a block 8, having longitudinally-arranged slots 9 and 10 thereon, said slots being at right angles with each other and arranged in a longitudinal center of the respective sides of the block.

Pivotally secured in the slot 10 is a dog 11, on the lower edge of which, near its free extremity, is a concaved seat 12 for the reception of the curved free edge 13 of the pivoted trigger 14, also arranged in the slot 10, but in the side opposite to that in which the dog 11 is pivoted.

The trigger 14 is provided with a laterally-extending arm 15 at right angles to the vertical arm 16 thereof, and the purpose of so constructing the device will be specifically described and understood in the following explanation. The sides of the block 8 are pierced by a suitable opening at right angles to the trigger 14, which is also provided with an opening alining with the openings in the block.

A pin 16', of copper or other material, is to be inserted through the alining openings, so as to normally hold the trigger shown in Fig. 4. However, when undue or abnormal pressure is exerted upon the arm 15 of the trigger the pin will become broken, so as to permit the arm 15 to drop, thus releasing the dog 11 and detaching the clevis from the bar 17. This bar is provided at its upper extremity with a longitudinal slot of approximately the same width as the slot 10 in the block 8. This slot is designed to aline with the slot 10, so that by forcing the dog 11 through the same and arranging the trigger in the position shown in Fig. 4 the clevis and bar will be securely locked together.

In order to guide the bar 17 in proper relative position with relation to the block, I provide a guide-rib 18 thereon which can be inserted in the slot 10 from the end of the block. Intermediate the ends of the bar 17 is a head 19, which is in the form of a truncated cone. the frustum thereof extending upwardly and the lower portion of the head being provided with a bearing-surface at right angles to the bar 17, whereby under certain conditions the surface of the head will rest upon the oppositely-disposed pivoted jaws 20 and 21, carried by the platform 22, supported on springs 23 and held by the tower 1. The lower end of the bar 17 is connected by suitable means to the top of the cage, an integral stem 24 extending a suitable distance from the head 19 for this purpose.

The jaws 20 and 21 are pivotally secured to the platform 22 by shafts 25 and 26, respectively, which are journaled in suitable bearings of any preferred form. On the end of the shafts 25 and 26 are two upwardly-projecting approximately parallel levers 27 and 28, which are connected near their upper extremities by a tension-spring 29. In order that the levers 27 and 28 will work in unison, and thereby cause a corresponding movement of the respective jaws, I provide a compensating device in the form of a normally vertical lever 30, pivoted to a block 31, and from the two ends of the lever 30 project oppositely-disposed link-bars 32 and 33, which in turn are pivoted to the levers 27 and 28.

Under normal conditions it is desirable to keep the jaws 20 and 21 open. In order to do this, it is essential that the upper ends of the levers 27 and 28 be spread apart. For this purpose I arrange adjacent the levers and in suitable bearings in the tower a transverse shaft 34, intermediate the ends of which are trips 35, one being arranged for each lever. The trips are adjustably secured on the shaft 34, whereby the distance that the levers 27 and 28 are to be spread apart can be regulated. The trips 35 are provided with transversely-projecting lips 36, which are oppositely disposed and extend from the outer edges of the trips to engage the lugs or projections 37 on the levers 27 and 28, whereby said levers are held in an extended position. Adjacent one end of the shaft 34 is a horizontal arm 38, parallel with a similar arm 39 on the transverse shaft 40, arranged a suitable distance below the platform, said arms 38 and 39 being connected by a link-rod 41. Projecting from the shaft 40 is an arm 42, which is designed to be engaged by the upper edge of the cage or elevator, whereby the shaft 34 will be rocked through the medium of the arm 39, link 41, and arm 38. The rocking of the arm 34 will cause the trips 35 to be thrown out of engagement with lugs or projections 37 of the respective levers 27 and 28, thereby permitting the tension-spring 29 to retract the free ends of the levers toward each other. This retraction of the levers 27 and 28 will cause a rocking motion to be imparted to the shafts 25 and 26, thereby causing the upper ends of the supporting-jaws 20 and 21 to move toward each other and embrace the stem 24 of the rod 17, so that when the clevis is released from engagement with the rod the supporting-face of the head 19 will rest upon the tops of the jaws, so that the cage will be suspended within the tower.

As the platform 22 is spring-supported with relation to the tower, the sudden jar caused by depositing the weight of the cage or elevator thereon will be absorbed by the springs, thereby relieving the strain on the tower.

In order to effect a release of the clevis from the bar 17, I provide a releasing-trip in the upper portion of the tower, which comprises a vertical shaft 43, carrying a recessed shoe 44, which extends horizontally within the tower, a handle 45 being provided on the shaft whereby the shoe can be thrown into and out of alinement with the arm 15 of the trigger 14 by rotating the shaft 43. In order to guide the clevis vertically and in proper operative relation with the remaining parts, I arrange on suitable supports in the upper portion of the tower a guide 46, which comprises an angle-plate, in the rear of which are bracing ribs or flanges 47.

All of the parts being properly assembled and provided the engine is properly controlled, the cage will only rise to a level with the surface, as shown in Fig. 1. If, however, the engineer neglects to stop the engine at the proper time, the cage will be hoisted above the surface of the ground, and the distance from the head to the top edge of the cage will be so regulated that the edge of the cage will strike the arm 42 before the arm 15 comes in contact with the shoe 44. As soon as the arm 42 is engaged by the edge of the cage shaft 34 will be actuated so as to throw the trips 35 out of engagement with the lugs or projections on the levers 27 and 28, so as to bring the jaws 20 and 21 toward each other. The head 19 will pass up through the jaws, causing them to close in and embrace the stem 24 before the arm 15 comes in contact with the shoe 44. As soon as the arm comes in contact with the shoe 44, however, the resistance of the shoe against the arm will result in cleaving or cutting the pin 16, causing the trigger 14 to assume a position shown in the dotted lines in Fig. 1. As this trigger supports the dog 11, which projects through the slot in the bar 17, an upper edge of said slot will cause the dog to assume a vertical position, as shown in dotted lines in Fig. 4, thus releasing the clevis from engagement with the bar. If the drum on which the cable 5 is wound continues to revolve, the clevis will be carried through the opening in the top of the tower, passing over the pulley, thus ultimately coming in contact with the drum unless the drum is stopped. Thus no injury will occur to the tower or any of the mechanism supported thereby.

While I have specifically described what to me at this time appears to be the very best means of accomplishing the desired result, I do not limit myself to the exact construction shown. I reserve the right to make such changes as may from time to time suggest themselves and come within the scope of the following claims.

Having described my invention, what I claim is—

1. The combination with a tower, of a vertically-reciprocating cage therein, means for raising and lowering the cage, means for automatically releasing the first-named means from the cage, a resilient platform intermediate the top and bottom of the tower for suspending the cage and holding it at a determined height when the first-named means is released, and devices for causing the support to prevent the cage from moving toward the bottom of the tower when the first-named means is released therefrom.

2. The combination with a tower, of a vertically-reciprocating cage therein, a cable secured to the top of the cage, a pair of spring-actuated supporting-jaws arranged in the tower and designed to support the cage against downward movement when it reaches a predetermined height in the tower, means for holding the jaws apart, and means for causing them to close when the cage is at a determined height.

3. The combination with a tower, of a vertically-reciprocating cage therein, a cable for raising the cage, means for automatically releasing the cable from engagement with the cage, a pair of resiliently-supported spring-actuated jaws to retain the cage suspended in the tower when the cable is released, means for normally holding the jaws apart, and means for causing them to spring together when the cage is at a determined height.

4. The combination with a tower, of a vertically-traveling cage in the tower, a cable for raising the cage, means for automatically releasing the cage from engagement with the means for raising it, a trip for actuating the releasing means when the cage reaches a determined height, a pair of spring-operated jaws for holding the cage suspended with relation to the tower, and a system of cranks and levers for simultaneously operating the jaws.

5. The combination with a tower, of a vertically-moving cage in the tower, means for raising the cage, of a resiliently-supported platform within the tower, a pair of horizontally-pivoted spring-actuated jaws carried by the tower, and a mechanism for actuating them to support the cage by the platform when the propelling means becomes disengaged with relation to the cage.

6. The combination with a tower, of a vertically-moving cage in the tower, a head arranged above the cage and connected thereto, a clevis removably connected to the head, a cable connected to the clevis for raising the cage, a pivoted trigger carried by the clevis, a horizontally-moving pivoted trip for actuating the trigger to release the clevis from engagement with the head, and means for engaging the head to support the cage in the tower when the clevis is released.

7. The combination with a tower, of a vertically-moving cage therein, a cable for raising the cage, a rod connected to the top of the cage, a removable clevis secured to the rod and provided with a releasing-trigger, and a horizontally-moving pivoted trip for actuating the trigger, so as to release the clevis from engagement with the rod.

8. The combination with a tower, of a vertically-moving cage therein, a cable for elevating the cage, a rod connected to the top of the cage, a removable clevis secured to the rod and provided with a releasing-trigger, a horizontally-swinging trip carried by the tower for actuating the trigger so as to release the clevis from engagement with the rod, and resilient means for engaging the rod when the clevis is released to suspend the cage in the tower.

9. The combination with a tower, of a vertically-reciprocating cage therein, pivoted jaws in the tower, levers connected to the jaws and working in unison to cause the jaws to work simultaneously toward and away from each other, trips in engagement with the levers to hold the jaws apart, and means for actuating the trips whereby the jaws may close to support the cage against downward movement when it has reached a predetermined height in the tower.

In testimony whereof I affix my signature in presence of two witnesses.

JOHN G. SCOTT.

Witnesses:
ROBT. J. GREEN,
WM. TAYLOR.